H. A. MARKLE.
AUTOMATIC CONTROLLER FOR CAMERA SHUTTERS.
APPLICATION FILED MAR. 13, 1918.

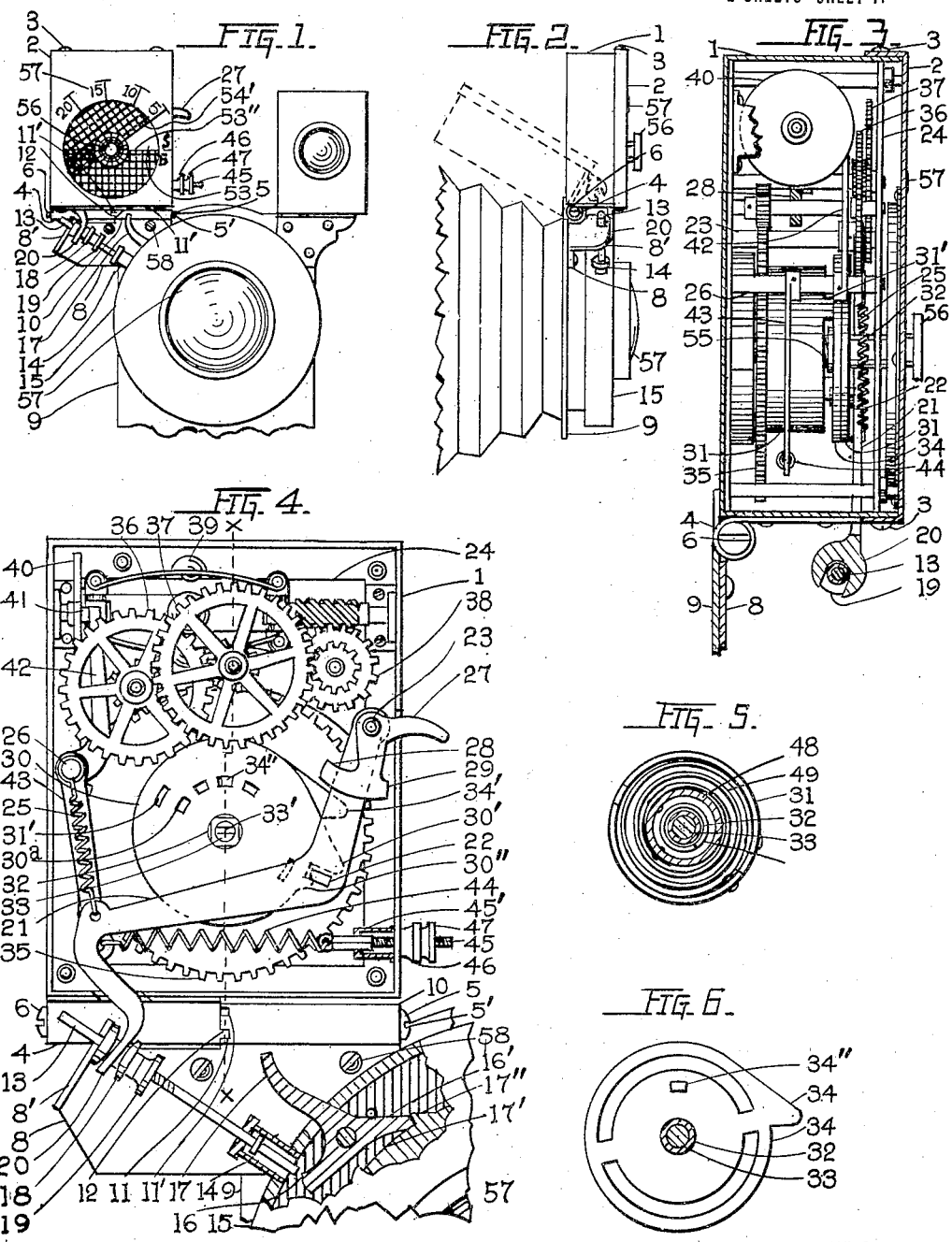
H. A. MARKLE.
AUTOMATIC CONTROLLER FOR CAMERA SHUTTERS.
APPLICATION FILED MAR. 13, 1918.
1,334,501. Patented Mar. 23, 1920.
2 SHEETS—SHEET 1.
INVENTOR.
Holly A. Markle
BY George H. Hinton
ATTORNEY.

1,334,501.

Patented Mar. 23, 1920.
2 SHEETS—SHEET 2.

UNITED STATES PATENT OFFICE.

HOLLY A. MARKLE, OF ST. JOSEPH, MISSOURI.

AUTOMATIC CONTROLLER FOR CAMERA-SHUTTERS.

1,334,501.  Specification of Letters Patent.  Patented Mar. 23, 1920.

Application filed March 13, 1918. Serial No. 282,331.

*To all whom it may concern:*

Be it known that I, HOLLY A. MARKLE, a citizen of the United States, residing at St. Joseph, in the county of Buchanan and State of Missouri, have invented certain new and useful Improvements in Automatic Controllers for Camera-Shutters, of which the following is a specification, reference being had therein to the accompanying drawings.

My invention relates to improvements in automatic controlling mechanisms for camera shutters, and the objects of my improvements are, first; to provide a simple, substantial and durable mechanism of this class which can be set for the operation of a camera shutter at the end of a predetermined period of time after the mechanism is released, thereby permitting the operator of the mechanism to take such position as he desires, in front of the camera lens, before the exposure is made; thus including a picture of himself in the negative thus made, second; to so construct and arrange the parts of the mechanism that they can be set for automatically operating the camera shutter, for making instantaneous or bulb or time exposures of various lengths, third; to provide ready means for so moving the mechanism that it does not obstruct access to the ordinary trigger lever now in use, fourth; to so construct and arrange the parts of the mechanism that they can readily be attached to or detached from cameras now in use, without changing the construction of said cameras, and be especially adapted for use on cameras known as kodaks.

I attain these objects by the mechanism illustrated in the accompanying drawings, in which:—

Figure 7:
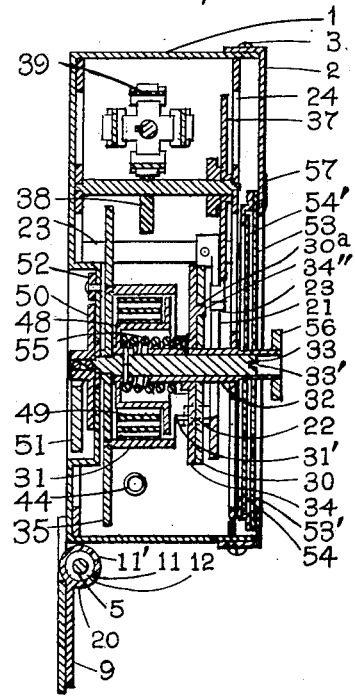
Figure 8:
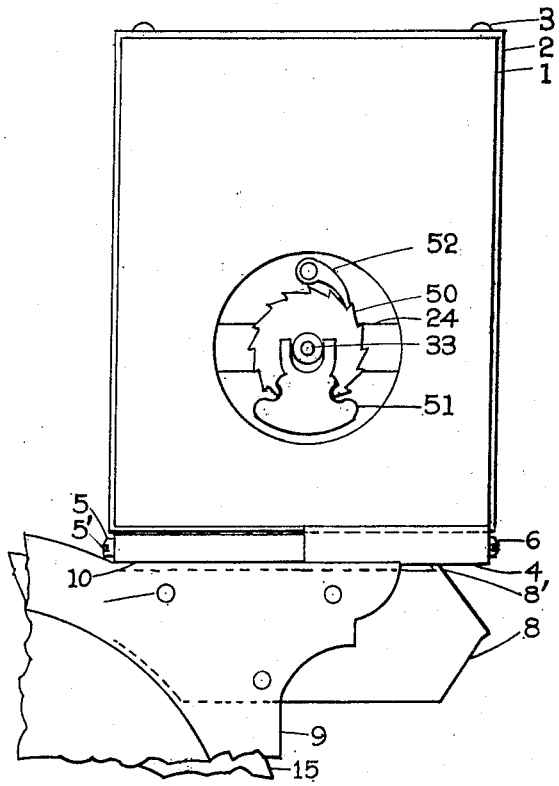
Figure 9:
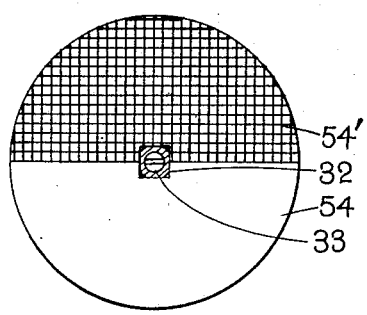
Figure 10:
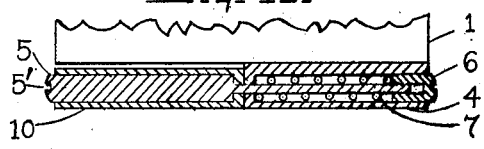

Figure 1 is a reduced front view of the mechanism and of a portion of a kodak camera. Fig. 2 is a side view of the parts shown in Fig. 1, looking toward the right. Fig. 3 is a side view of the mechanism, looking toward the right, certain parts being broken away. Fig. 4 is a front view of the mechanism, with the cover removed and certain parts broken away. Fig. 5 is a front view, in detail of the main-spring and adjacent parts, certain parts being broken away. Fig. 6 is a front view of the rear cam. Fig. 7 is a section, on the line X X, seen in Fig. 4, cut longitudinally through the winding shaft, looking toward the right. Fig. 8 is a rear view of the mechanism, showing the winding devices in detail. Fig. 9 is a front view in detail of the rear indicator disk. Fig. 10 is a vertical section in detail, cut longitudinally through the center of the hinging mechanism, looking toward the front.

Referring to Figs. 3 and 4, the mechanism comprises case 1, provided with the removable cover 2, which is secured on said case by screws 3. Hinge member 4 is secured on the bottom of the outer portion of case 1. The inner end of said hinge portion is oscillatably mounted on the central portion of hinge pin 5, while its outer end is similarly mounted on the adjusting nut 6, seen best in Fig. 10. The helical spring 7 is loosely mounted on said hinge pin, between the inner end of hinge member 4 and nut 6, which latter is screwed on the end portion of said hinge pin, for adjusting the tension of said spring. Hinge member 10 is formed on the upper edge of bracket 8, which latter is secured on the front plate 9 of the camera. The larger, inner portion of hinge pin 5 is mounted in hinge member 10, and has screw driver slot 5' formed therein by which said pin is held against rotation while nut 6 is being turned as previously mentioned.

The outer end of hinge member 10 has the notches 11 and 11' (see Fig. 4,) formed therein. Lug 12 is formed on the adjacent end of hinge member 4, and is detachably held in said notches respectively, for holding case 1 in the position shown and in the position indicated by dotted lines, seen in Fig. 2.

Bracket 8 has the bearing bracket 8' formed on its upper outer corner, in which the outer end of the drive rod 13 is slidably guided. The inner end portion of said rod is similarly guided in nipple 14, the inner end of which is screwed into an aperture formed through the annular wall of the shutter case 15. Trigger 16 has pawl 16' and thumb lever 17 formed therewith. Said trigger is oscillatably mounted in the shutter case, with its pawl normally in engagement with the ratchet tooth 17" for detachably holding shutter 17' against oscillation.

Drive rod 13 is moved inward against the free end of trigger 16, thereby moving the pawl 16' from its previously described engagement, thereby releasing shutter 17'.

Since my invention is solely for the purpose of moving and thereby releasing said trigger from its engagement, which trigger and shutter form no part of my invention, the same are neither fully shown nor described.

Drive rod 13 has the shift collar 18 screwed thereon, for adjustably setting the inner end of said rod toward or from the free end of said trigger, for adjusting the movement thereby imparted to the latter. Lock nut 19 is screwed against said collar for holding it in its various adjustments.

Said collar is engaged by shifter fork 20, which is formed on the free end of drive lever 21. Said lever has the friction stud 22 secured in its intermediate portion, while the opposite end of said drive lever is secured on the shaft 23, which latter is oscillatably mounted in frame 24.

One end of recover spring 25 is connected with the free end portion of said lever, while its other end is loosely connected with rock shaft 26, which is oscillatably mounted in frame 24. Said drive lever is provided with the manually operated release lever 27 which is oscillatably mounted on shaft 23. Said release lever has the pull stud 28 formed thereon, which extends over the adjacent edge of drive lever 21, for moving said lever. Stop lug 29 is formed with said release lever, and is moved against the inner surface of case 1, for limiting its movement.

Front cam 30 has cam projection 30′ formed on its periphery and holding projection 30″ formed on its edge adjacent to said cam projection. A plurality of apertures 30ª are formed through the body portion of said cam, which is secured on the front ends of the drum arms 31′, which arms are formed on the front end of drum 31. Said front cam is rotatably mounted on sleeve 32, (see Fig. 7,) the front end portion of which is slidably and rotatably mounted in frame 24. The rear end of said sleeve is similarly mounted on winding shaft 33. The front end of said shaft is rotatably mounted in said sleeve, while its rear end is similarly mounted in the rear portion of frame 24.

Rear cam 34 is secured on sleeve 32 and has cam projection 34′ formed on its periphery, (see also Fig. 4,) and engaging stud 34″ formed therewith. Said stud is inserted in the desired one of apertures 30ª for detachably engaging said rear cam with front cam 30, in various rotative relations thereto.

Drive gear 35 is secured on the rear end of drum 31, and is rotatably mounted on the rear end portion of winding shaft 33. Said gear is engaged with the first one of a train of gears 36, 37 and 38, for rotating the centrifugal governor 39 at high speed. Said governor is mounted in bracket bearings secured on frame 24. Said governor is provided with the brake disk 40, against which the oscillatably mounted brake shoe 41 is elastically pressed, for retarding the speed of said governor and the therewith engaged and connected parts, including cams 30 and 34.

Since said governor is of a well known type and does not form an original part of my invention, it is not fully described. Said brake shoe is secured on the upper end of the upper brake lever 42, the lower end of which is secured on rock shaft 26. The upper end of the lower brake lever 43 is secured on said shaft and has one end of tension spring 44 connected with its lower end. The other end of said spring is connected with the inner end of the square portion of adjusting rod 45. Said square portion of said rod is passed through a square aperture formed in the inner end of sleeve 45′ the outer end of which is secured in the wall of case 1.

The outer end portion of said rod is passed through an aperture through said case and is screw threaded. Tensioning nut 46 is screwed on the threaded end of rod 45 for adjusting the tension of spring 44, and lock nut 47 is screwed against said nut for holding said nut in its various adjusted positions.

Referring to Fig. 7, the rear end of spring chamber 48 is secured on the winding shaft 33. The inner end of the main-spring 49 is secured on the outer surface of said chamber, while the outer end of said main-spring is secured on the inner surface of drum 31, for driving the hereinbefore described cams and drive gear 35.

Referring to Fig. 8, ratchet wheel 50 is secured on the rear end of the winding shaft 33, and has the winding key 51 oscillatably mounted thereon. Pawl 52 is oscillatably mounted on the inset rear surface of case 1, and engages the teeth of said ratchet wheel, for preventing rotation of said wheel in one direction.

Referring to Fig. 7, pane 53 is secured on the inner surface of the case cover 2, closing a large annular opening formed therethrough. The upper half of said pane is transparent, while its lower half 53′ is painted black. Sleeve 32 passes loosely through an aperture formed through the center of said pane. The indicator disk 54 is mounted just back of, and adjacent to said pane. Said disk has a square aperture formed through its center, through which the square front end portion of sleeve 32 is slidably passed, for supporting and rotating said disk. The lower half of said disk is painted white, while its upper half 54′ is painted black. This arrangement of disks and their painted surfaces provide indication of the movement of said indicator disk which is more readily seen at a distance than an ordinary indicator hand.

While said indicator disk is set to indicate instantaneous or bulb exposures, it is in what I term normal position, showing the black portions of the pane and disk as one annular solid black surface.

Referring to Fig. 7, one end of the helical spring 55 is mounted on the hub portion of spring chamber 48, while the other end of said spring is mounted on sleeve 32, with its ends pressing against the inner surfaces of said chamber and the hub portion of rear cam 34, for yieldably holding said cam against the front cam 30.

Sleeve 32 has thumb button 56 secured on its front end, whereby said sleeve and its connected parts are moved backward from the position shown, and are rotated as hereinafter described.

In operation, with the parts in the position shown in Figs. 1 and 4, the operator of the mechanism places his index finger on the top of case 1 and with his thumb lifts release lever 27, until lever stop 29 is stopped against the inner surface of case 1. This action oscillates drive lever 21 until its friction stud 22 is thereby moved out of engagement from the holding projection 30″, thereby releasing front cam 30 and its connected parts, including spring drum 31, seen in Figs. 5 and 7. Said parts are slowly rotated counter-clockwise, by the action of main-spring 49.

While these parts are thus rotating, said operator takes such position as he desires, in front of the camera lens 57, seen in Fig. 1, in order to have the picture of himself taken in the picture about to be made.

As the described parts are slowly rotating the indicator disk 54 is thereby similarly rotated, first moving all of its white surface into view through the upper, transparent portion of pane 53. At this juncture, the operator of the mechanism resorts to the usual precautions used when a photographic exposure is about to be made; such as saying to others, "keep still, look pleasant," and the like.

Continued rotation of said parts moves all of the black surface 54′ into view through the upper, transparent half of the pane 53, at which juncture the camera shutter 17′ (see Fig. 4,) is opened in the following described manner.

During the latter part of the described rotation of said parts, rear cam projection 34′ is moved against the friction stud 22, (see Fig. 4,) which oscillatably moves said stud, thereby moving the free end of drive lever 21 and its shifter fork 18 downward and toward the right, from the position shown. Said shifter fork, by collar 18 drives the drive rod 13 thereby moving the inner end of said rod against trigger 16, thereby oscillating said trigger and releasing its pawl 16′ from engagement with ratchet tooth 17″, thereby releasing the shutter 17′, which is actuated to open by parts that are well known and are therefore not shown.

Said shutter having previously been set for a time exposure, remains open until after the following described action takes place.

After cam projection 34′ passes the friction stud 22, lever 21 and its connected parts are returned by action of the spring 25 from their described position to a position with said friction stud between the cam projections 34′ and 30′. Continued rotation of said parts moves cam projection 30′ against said friction stud, thereby repeating the previously described operation of trigger 16, which closes shutter 17′, thus making what is termed a time exposure.

After this action takes place, recover spring 25 repeats its recover movement of its connected parts, moving friction stud 22 in the position shown, which by stop projection 30″, stops further rotation of said cams. These movements are repeated for each time exposure, until main-spring 49 needs rewinding, which is done by oscillating the key 51 to a horizontal position, and thereby manually rewinding said spring, by rotating said key in the usual manner of winding clocks.

For lengthening or shortening the time of said exposures, the operator presses button 56 inward, thereby similarly moving sleeve 32 and the therewith connected rear cam 34, until its lug 34″ is disengaged from cam 30, after which he rotates said button, until the right edge of the black surface 54′ is in register with the desired indication 57, which indicates the length of time of the exposure to be made, upon which he removes his thumb from said button. When this is done, spring 55, (see Fig. 7,) moves cam 34, until said cam is stopped against cam 30, with lug 34″ in the desired one of apertures 30$^a$, thereby lengthening or shortening the distance between the extremities of the cam projections 34′ and 30′, seen in Fig. 4.

The mechanism is set for bulb and instantaneous exposures, by repeating the described disk setting operations in which all of the black surface 54′ is exposed through the upper, transparent portion of pane 53, with the cam projection 34′ set in register with the cam point 30′.

The shutter 17′ is also set for such exposures, by parts which form no part of my invention, and are therefore neither shown nor described.

While the previously mentioned shutter is set for bulb exposures, said shutter is opened upon inward movement of trigger 16 and closes upon its outward movement.

While the extremities of cam projections 34' and 30' are simultaneously passing the friction stud 22, they hold said stud in its outward position and thereby hold the extremity of trigger 16 in its inward position, a sufficient length of time in which to make a bulb or short time exposure.

The rounded extremities of said cam projections retard the first portion of the inward movement of said friction stud and permit said stud to gradually increase in speed as they move therepast through the recover movement which is actuated by spring 25, as previously described; thereby producing easy movement of said stud and the thereby controlled parts during the first portion of said recover movement.

While the shutter is set for instantaneous or snap exposures, said shutter both opens and closes, upon movement of trigger 16 to the limit of its inward travel.

For the making of such exposures, said cam projections remain in register with each other, and the exposure is effected when their extremities have moved against said friction stud, thereby moving trigger 16 inward as previously described.

Referring to Fig. 4, when it is desired to increase or retard the speed of the previously described operations of the mechanism, lock nut 47 is loosened and the tension of spring 44 is changed as desired, by turning the tensioning nut 46, after which said nut is secured in position by tightening said lock nut. This regulates the pressure of brake shoe 41 against brake disk 40, thereby regulating the speed of the governor 39, which in turn, by its connecting gears, regulates the speed of the movement of the entire mechanism. When it is desired to manually operate the thumb lever 17 for manual operation of the therewith connected parts, the operator forces case 1 toward the left, overcoming spring 7, (see Fig. 10,) thereby disengaging lug 12 from notch 11, and oscillates said case from the position shown, to the position indicated by dotted lines in Fig. 2, thereby permitting free access to lever 17.

By removing the bracket screws 58, and unscrewing nipple 14 from the shutter case 15, (see Fig. 4,) the entire mechanism is released for removal from the camera.

While I have shown and described the mechanism, as a removable attachment for a camera, it is evident that it could be so constructed as to be an integral part of the camera, and inseparable therefrom, which I reserve the right to do.

Having fully described my invention, what I claim as new and desire to secure by Letters Patent is:—

1. In a controller for moving the trigger of a camera shutter; a case mounted on said camera; a lever one end of which is pivotally mounted in said case the free end of said lever being adapted to move said camera trigger; a recover spring one end of which is connected with a fixed object in said case the other end of said spring being connected with the intermediate portion of said lever for oscillating the latter in one direction; a friction stud secured on one side of the intermediate portion of said lever; a spring drum rotatably mounted in said case; a coil spring in said drum for rotating it in one direction; a front cam secured on the front end of said drum; a front cam projection formed on the periphery of said front cam for oscillatably moving said friction stud and the therewith connected lever in the opposite direction; a rear cam slidably and rotatably mounted adjacent to said front cam; a rear cam projection formed on said rear cam for similarly moving said stud and lever; and adjusting and securing means formed with said cams whereby said rear cam is rotatively adjusted in its relation to said front cam and is detachably held in its adjustments.

2. In a controller for moving the trigger of a camera shutter; a case mounted on said camera; a spring drum rotatably mounted in said case; rotating means whereby said drum is rotated at a predetermined speed; a trigger operating lever oscillatably mounted in said case; a front cam secured on the front end of said drum said cam having a plurality of engaging apertures formed therethrough; a front cam projection formed on the periphery of said front cam for moving said lever in one direction; a shaft for said drum; winding means whereby said shaft is rotated for winding up said rotating means; a sleeve slidably and rotatably mounted on said shaft; a thumb button secured on the outer end of said sleeve whereby the latter is slid and rotated; a rear cam secured on said sleeve; a rear cam projection formed on the periphery of said rear cam for similarly oscillating said lever; an engaging stud formed on one side of said rear cam; a helical spring mounted on said sleeve whereby said sleeve and the thereon secured rear cam are moved forward for moving said stud into a predetermined one of said apertures; an indicating disk mounted on said sleeve for rotation by said sleeve; and indications formed on the front of said case wherefrom the amount of the rotative movement of said disk is visibly ascertained.

3. In a camera shutter controller; a case mounted on said camera; a spring drum rotatably mounted in said case; a spring in said drum whereby the latter is rotated; a pair of cams rotated by said drum for operating the parts of the controller; a governor shaft rotatably mounted in said case; a train of gears from said drum to said shaft for rotating the latter at high speed; a brake disk slidably mounted on one end portion of said shaft; a plurality of centrifugally flexed springs one end of each spring being pivotally connected with said shaft the other ends of said springs being similarly connected with said brake disk; a brake lever oscillatably mounted in said case; a brake shoe on the free end of said lever said shoe being in frictional contact with said disk for retarding the speed of said disk and all of the therewith connected parts; a brake spring whereby said shoe is yieldably held in said frictional contact; spring adjusting means against the outer surface of said case whereby the tension of said brake spring is adjusted; and holding means whereby said adjusting means is held in its various adjustments.

4. In a controller for depressing the trigger of a camera shutter; a case mounted on said camera; a lever oscillatably mounted in said case; oscillating means whereby said lever is oscillated reciprocatively; a slidably mounted rod for depressing the free end of the lever of said trigger said rod having a screw threaded portion formed thereon; a shifter collar screwed onto said screw threaded portion of said rod; a lock nut screwed onto said rod against said collar; and a shifter fork in engagement with said collar said fork being formed on the free end of said lever; the whole forming adjusting means for adjusting the depth into said shutter of the movement of the depressing end of said rod.

In testimony whereof I affix my signature in the presence of two witnesses.

HOLLY A. MARKLE.

Witnesses:
C. A. YOUNG,
D. E. GORDON.